UNITED STATES PATENT OFFICE 2,521,892

REACTION OF PHOSPHORUS HALIDES WITH TRIALKYL PHOSPHATES AND RESULTING PRODUCTS

Alan Bell, Kingsport, Tenn., assignor to Eastman Kodak Company, Rochester, N. Y., a corporation of New Jersey No Drawing. Application December 26, 1946, Serial No. 718,616

6 Claims. (Cl. 260—461)

This invention relates to the reaction between trialkyl phosphates and phosphorus trihalide or pentahalide and the insecticides resulting therefrom. The product from the reaction may be further treated with heat, water, alcohols, mercaptans, or amines, and the resulting products also have insecticidal properties.

Insecticides ordinarily divide themselves up into those of the contact type, the most commonly known members of which are nicotine sulfate, pyrethrum, and rotenone, and those which poison by ingestion thereof. In recent years new materials of the contact insecticidal type have been developed, the most commonly known of these new materials being DDT and Bladan, the latter a German development.

One object of my invention is to provide a new type of phosphorus compounds which are eminently suited for use as contact and stomach insecticides. Another object of my invention is to provide a method of preparing insecticides using trialkyl phosphates as the starting material. A further object of my invention is to provide a method for preparing contact insecticides in which phosphorus halides are employed as the starting material. A still further object of my invention is to prepare a type of phosphorus compounds in which various modifications are possible to produce insecticidal materials having the desired killing properties. A still further object of my invention is to provide mixtures of phosphorus compounds whereby insecticidal properties are maintained over a comparatively long period.

I have found that the residues resulting from the reaction of trialkyl phosphates with phosphorus halides are useful for insecticidal purposes and that those residues may be modified by further treatment to obtain additional compounds having insecticidal properties. My invention in its broadest aspects comprises the reaction between trialkyl phosphates and phosphorus tri- and penta-halides. In the case of phosphorus trihalide, alkylhalide is distilled off during the reaction and free phosphorus is precipitated out of the reaction mixture. The product, whether or not it is filtered from the phosphorus, is a powerful insecticide.

In the case of phosphorus pentahalide that compound reacts with three molecules of trialkyl phosphate to produce a product which still contains two active halogens. This product can be used directly as an insecticide or the halogen may be replaced with water, alcohols, mercaptans, or amines forming products having insecticidal properties. The organic phosphates which may be employed as the starting materials in processes in accordance with my invention are any of the lower alkyl, aryl or mixed aryl alkyl phosphates. The phosphates of the lower alcohols, such as triethyl phosphate have been found to be particularly useful for this purpose. A triethyl phosphate useful as the starting material in the preparation of insecticides in accordance with my invention is that prepared by the process described and claimed in U. S. Patent No. 2,407,279, dated September 10, 1946, of Hull and Snodgrass. Other compounds which may be employed as the starting material are tripropyl phosphate, tributyl phosphate, triamyl phosphate, trimethyl phosphate, or tri-2-ethyl hexyl phosphate or, in other words, any of the trialkyl phosphates, the alkyl groups of which are no more than eight carbon atoms. If desired, trialkyl phosphates in which the alkoxy groups have substituents thereon, such as chlorine or alkoxy groups, may be employed to prepare materials having effective toxic properties by the process described herein. The lower aryl phosphates, such as triphenyl or tricresyl phosphates, the mixed alkyl phosphates, such as ethyl propyl or ethyl butyl phosphates, or the mixed aryl alkyl phosphates, such as ethyl phenyl phosphates may be employed as the starting material for the process in accordance with my invention.

The reaction of a trialkyl phosphate, R representing alkyl, with phosphorus pentachloride is as follows:

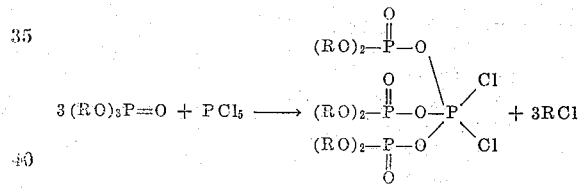

The dichloro product thus obtained may be reacted with an alcohol, such as ethyl alcohol, and the halogens are thereby replaced by alkoxy groups. This dihalogen compound may be reacted with water, and the halogens will be replaced with hydroxy groups. If the dihalogen compound is reacted with amines, the halogens are replaced by amino groups. If the dihalogen compound is heated further, alkyl halide is driven off and a new type of phosphorus compound is obtained. As three moles of the trialkyl phosphate are employed for every mole of the phosphorus halide, it is ordinarily desirable that the starting materials of this reaction be used in those proportions although also included within the scope of my invention are variations from these proportions. In some cases it is desirable to promote the reaction by the application of heat, whereas in other cases the reaction proceeds with vigor and cooling may even have to be resorted to. It is desirable, however, to finish up the reaction at a temperature above the boiling point of the alkyl halide to be driven off if that compound has been formed. In the case of the halides having fairly high boiling points, it may even be desirable to finish up the reaction at a slightly reduced pressure so as to avoid the use of a greatly elevated temperature to drive off the alkyl halide. However, it is preferred that any volatile materials be driven off so as to obtain the residue. It is preferred that this residue be employed as it is obtained as refining of this residue may result in a decrease of insecticidal properties, particularly if the material is distilled at a greatly elevated temperature. However, distillation under reduced pressure may be employed for removing diluents. That is, the use of a greatly elevated temperature may result in some decomposition of the product which is formed, particularly if the decomposition product is such that it does not exhibit insecticidal properties.

The following examples illustrate my invention:

*Example 1.*—287 parts of triethyl phosphate and 72.5 parts of phosphorus trichloride were heated to 105–110° C. for six hours. Ethyl chloride began to distil off at once and red phosphorus separated out of the solution. The solution was filtered from the suspended phosphorus to yield 225 parts of a light-colored oil containing 17.4%–20% phosphorus. It also had the following properties:

$$d_4^{20} = 1.19-1.21$$

$$\eta_D^{20} = 1.41-1.43$$

This material was found to be a powerful insecticide showing greatly improved insecticidal properties over the contact insecticides which are available at the present time.

*Example 2.*—273 parts of triethyl phosphate were mixed with 104 parts of phosphorus pentachloride. The reaction of these two materials was vigorous, and it was necessary to control the temperature below 100° C. until the vigorous stage had passed. The mass was then heated for three hours at 90–100° C. or until the theoretical amount of ethyl chloride had been evolved. 285 parts of a dark-colored oil consisting principally of a compound having the following structural formula was obtained:

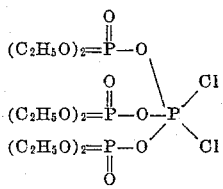

This material could be employed directly as an insecticide.

*Example 3.*—The product obtained in Example 2 was heated for a longer time, and at 130–140° C. an additional amount of ethyl chloride was distilled off until no further evolution of ethyl chloride occurred. The product obtained was analyzed and from the analytical result was believed to have the following formula:

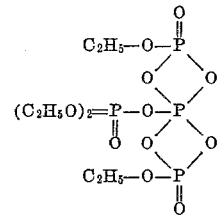

*Example 4.*—56 parts of the dichloro product from Example 2 were mixed with 3.6 parts of water and then heated to 70–80° C. for one-half hour until hydrogen chloride was no longer evolved. 48 parts of a dark-colored oil were obtained believed to have the following formula:

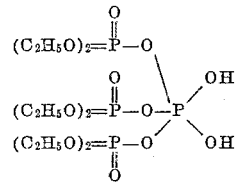

*Example 5.*—56 parts of the dichloro product from Example 2 were mixed with 8 parts of alcohol and heated to 110–120° C. for one-half hour until no further hydrogen chloride was given off. 60 parts of a material which essentially consisted of a phosphorus compound having the following probable formula were obtained:

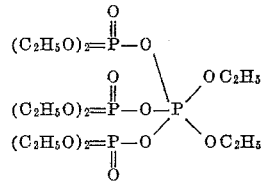

*Example 6.*—28 parts of the dichloro compound from Example 2 were dissolved in 50 parts of ether and were slowly treated while cooling with 19.8 parts of cyclohexylamine. The reaction was exothermic and the cyclohexylamine hydrochloride obtained was filtered off. The residue was washed with ether, and the combined filtrates were evaporated to yield 34 parts of a dark-colored liquid consisting mainly of a compound having the following probable formula:

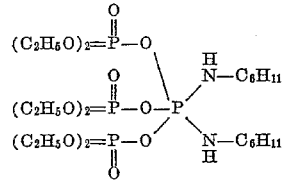

*Example 7.*—14 parts of the dichloro product as prepared in Example 2 were dissolved in 25 parts of ether and slowly mixed with 8 parts of 2,2'-difluoroethylamine while cooling with ice. The insoluble hydrochloride which formed was filtered. The filtrate was evaporated yielding 15 parts of a light-colored oil consisting mainly of a phosphorus compound having the probable formula:

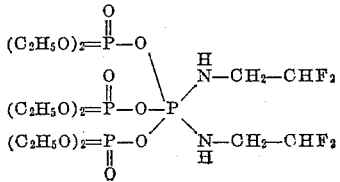

*Example 8.*—33.6 parts of tripropyl phosphate were warmed carefully with 10.4 parts of phosphorus pentachloride. Finally the mixture was maintained at 80–90° C. for one hour during which time the theoretical amount of isopropyl chloride was evolved. The light-yellow liquid was warmed at 70–80° C. for one hour with 4.6 parts of ethyl alcohol. 25 parts of a light-colored oil were obtained. The product was mainly a phosphorus compound having the following formula:

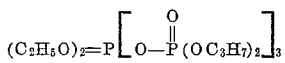

The products of my invention have shown themselves to be very potent contact insecticides. For example, ½ percent dusts were prepared from the compounds of the various examples and these dusts were tested using German roaches. The percentage of kill in hours with the various compounds prepared by the examples of my invention were as follows:

| Example | 1 hr. | 2 hrs. | 4 hrs. | 6 hrs. | 24 hrs. | 48 hrs. | 72 hrs. | 96 hrs. |
|---|---|---|---|---|---|---|---|---|
| 1 | 85 | 100 | | | | | | |
| 2 | 85 | 85 | 85 | 85 | 85 | 85 | 85 | 100 |
| 3 | | 15 | 30 | 40 | 50 | 85 | 85 | 100 |
| 4 | | 15 | 15 | 15 | 25 | 50 | 80 | 100 |
| 5 | 85 | 100 | | | | | | |
| 6 | | 15 | 30 | 50 | 50 | 60 | 85 | 100 |
| 7 | 50 | 80 | 80 | 80 | 80 | 80 | 100 | |
| 8 | | | | | 85 | 85 | 100 | |

These insecticides are not only effective against German roaches but also against various other types of lower animal life, such as plant lice, aphids, spiders, flies, bean beetles, Harlequin bugs, etc. If desired, these insecticides may be employed in the form of sprays instead of in the form of dust.

As shown by the tabulated results, some of the insecticides of my invention are quicker acting than others. As a general rule, however, the quicker acting insecticides of this type lose their potency sooner than do the slower acting insecticides of this type. Therefore, it is often desirable to use these compounds in the form of mixtures so that the time of effectiveness is materially increased. For instance, the insecticide of Example 5 might well be mixed with the insecticide of Example 8, and the resulting mixture not only would be effective within the first hour, but also would be effective seventy-two hours after the application thereof.

Other phosphorus halides than the chlorides may be employed in my invention. For instance, phosphorus trifluoride, phosphorus tribromide, phosphorus pentafluoride, or phosphorus pentabromide might be employed as the material to react with the organic phosphate in preparing insecticides as described herein.

I claim:

1. A method of preparing a phosphorus-containing reaction product having useful insecticidal properties which comprises reacting at a temperature between 80° C. and 140° C. a reaction mixture consisting essentially of a lower trialkyl phosphate and a binary compound of phosphorus and halogen, said reaction temperature being sufficient to cause the evolution of substantial quantities of alkyl halide from the reaction.

2. The method which comprises reacting together at a reaction temperature between 80° C. and 140° C. a reaction mixture consisting essentially of an alkyl phosphate, the alkyl groups of which are each less than eight carbon atoms, and the binary compound of phosphorus and halogen, phosphorus trichloride, said reaction temperature being sufficient to cause the evolution of substantial quantities of alkyl chloride from the reaction.

3. The process which comprises reacting together a reaction mixture consisting essentially of triethyl phosphate and phosphorus trichloride, said reacting being at a temperature causing the evolution of substantial amounts of ethyl chloride from the reaction.

4. A method of preparing a phosphorus-containing reaction product having useful insecticidal properties which comprises reacting together a reaction mixture consisting essentially of a lower trialkyl phosphate and a binary compound of phosphorus and halogen, said reacting being at a temperature sufficient to cause the evolution of substantial quantities of alkyl halide from the reaction.

5. The compound consisting essentially of the light-colored oily liquid containing 17.4% to 20% phosphorus and density and refractive index properties:

$$d_4^{20} = 1.19-1.21$$
$$n_D^{20} = 1.41-1.43$$

and having been prepared by a process in accordance with claim 3.

6. The compound:

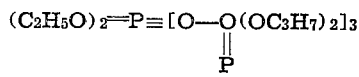

ALAN BELL.

REFERENCES CITED

The following references are of record in the file of this patent:

UNITED STATES PATENTS

| Number | Name | Date |
|---|---|---|
| 1,949,629 | Romieux et al. | Mar. 6, 1934 |
| 2,005,619 | Graves | June 18, 1935 |
| 2,242,260 | Prutton | May 20, 1941 |
| 2,336,302 | Schrader | Dec. 7, 1943 |

FOREIGN PATENTS

| Number | Country | Date |
|---|---|---|
| 311,935 | Italy | Oct. 16, 1933 |

OTHER REFERENCES

Ephraim, "Inorganic Chemistry," ed. by Thorne et al. (4th ed., 1943), page 745.

Chem. and Eng. News, September 10, 1945, pages 1520–1521.